(12) United States Patent
Witzel et al.

(10) Patent No.: US 6,758,780 B2
(45) Date of Patent: Jul. 6, 2004

(54) PLANETARY TRACTION DRIVE MECHANISM AND THROTTLE VALVE ASSEMBLY

(75) Inventors: Donald G. Witzel, Pittsford, NY (US); Joseph E. Muhleisen, Livonia, NY (US)

(73) Assignee: Delphi Technologies, Inc., Troy, MI (US)

( * ) Notice: Subject to any disclaimer, the term of this patent is extended or adjusted under 35 U.S.C. 154(b) by 201 days.

(21) Appl. No.: 10/062,028

(22) Filed: Jan. 31, 2002

(65) Prior Publication Data

US 2003/0141479 A1 Jul. 31, 2003

(51) Int. Cl.[7] .............................................. F16H 1/28
(52) U.S. Cl. ......................... 475/11; 475/183; 74/436
(58) Field of Search ..................... 475/11, 183, 185; 74/86, 436

(56) References Cited

U.S. PATENT DOCUMENTS

| | | | |
|---|---|---|---|
| 771,541 A | | 10/1904 | Ericson |
| 1,980,220 A | * | 11/1934 | Morton ..................... 475/11 X |
| 2,528,963 A | * | 11/1950 | Looney ..................... 475/11 X |
| 3,060,767 A | | 10/1962 | Parrett |
| 3,720,117 A | * | 3/1973 | Hart ............................ 475/183 |
| 4,483,216 A | * | 11/1984 | Takahashi et al. ...... 475/183 X |
| 5,931,759 A | * | 8/1999 | Otaki et al. ............. 475/183 X |
| 6,013,002 A | * | 1/2000 | Nonaka .................. 475/183 X |
| 6,024,664 A | * | 2/2000 | Shaffner ..................... 475/185 |

FOREIGN PATENT DOCUMENTS

JP          357200755     * 12/1982   .................. 475/183

* cited by examiner

Primary Examiner—Ha Ho
(74) Attorney, Agent, or Firm—Patrick M. Griffin

(57) ABSTRACT

An improved planetary traction drive mechanism for use in actuating a throttle valve assembly is provided. An electric drive motor supports a cup-shaped member defining the outer ring of the mechanism. The drive shaft of the motor extends into the cup-shaped member to define a sun roller and forming an annular space between the sun roller and the outer ring. An output plate is rotatably supported on the drive shaft, and one or more deformable planetary friction rollers are disposed in radial compression between the outer ring and the sun roller are mounted on the plate. An output shaft extends from the plate and may or may not be coaxially aligned with the sun roller. The output shaft may be connected via a link to a lever arm on the throttle shaft of the throttle valve, which may be used on an internal combustion engine.

13 Claims, 5 Drawing Sheets

PLANETARY TRACTION DRIVE MECHANISM AND THROTTLE VALVE ASSEMBLY

TECHNICAL FIELD

The present invention relates to planetary mechanisms for coupling the rotary motion of a first shaft to a second shaft; more particularly, to planetary traction transmissions for rotational speed reduction; and most particularly, to a planetary traction drive mechanism for actuating a throttle valve shaft.

BACKGROUND OF THE INVENTION

Planetary gear transmissions for coupling the rotation of a first shaft driving a sun gear to one or more planetary gears driving a second shaft are well known. Such transmissions inherently are rotation ratio reducers and, conversely, force multipliers wherein the rotation rate of the second shaft is always less than the rotation rate of the first shaft (ratio<1.0). It is further known to use traction rollers in place of the sun gear and planetary gears, although such systems require means for maintaining sufficient traction between the sun roller and the planetary rollers to prevent slippage therebetween when the torque load required by the application is applied to the transmission.

Traction may be increased by exerting inward radial force on the planetary rollers. For example, U.S. Pat. No. 771,541 to Ericson discloses a "friction gear" system wherein the diameter of a driven split-ring surrounding the planets may be reduced by mechanically constricting the ring to compress the planets radially and thereby control slippage between the sun roller and the planetary rollers. This system requires continuous slippage monitoring and does not possess inherently high resistance to such slippage.

This system is also illustrative of a first type of planetary drive system wherein the axes of the planetary rollers are stationary and the rollers do not revolve about the sun gear; instead, the outer ring and driven shaft are urged by rotation of the rollers to rotate in a direction counter to the rotation direction of the input drive shaft. Such a mechanism is employed, for example, in marine windlasses and capstans.

For another example, U.S. Pat. No. 3,060,767 to Parrett discloses a speed changing mechanism wherein planetary rollers contain an intermediate layer of an elastomer such as neoprene and outer cylindrical members made of steel having sufficient elasticity to permit deflection. In assembling the mechanism, the planetary rollers are pre-stressed radially before insertion between the outer ring and the sun roller. Release of the planetary rollers after assembly causes high pressures to be exerted at the points of contact thereof with the outer ring and the sun roller "to obtain high torque drive transmission therebetween without slipping." This system requires very high quality machining of the surface and diameter of the outer ring, the outer members of the planetary rollers, and the sun roller to provide a controlled interference assembly. During use of the device, radial forces, and hence slippage, may be affected by thermal expansion of the components.

This system is also illustrative of a second type of planetary drive system wherein the axes of the planetary rollers are mounted on a rotatable plate supporting an output shaft and the rollers revolve about the sun gear. The outer ring is stationary, and rotation and precession of the rollers about the sun roller cause the plate and output shaft to rotate in the same direction as the rotation direction of the input drive shaft.

Traction also may be increased by providing shear-thickening fluids to the roller surfaces. Such non-Newtonian fluids, when subjected to shear stress, undergo a viscosity increase, thereby increasing traction. A known use for such a system is as reduction gear for a naval vessel powered by a gas turbine engine. Such systems require costly and difficult high-quality machining of components, and the required exotic fluids are subject to decomposition and fatigue in use.

What is needed is a simple, inexpensive planetary traction drive mechanism wherein adequate traction results from a combination of radial compression of planetary rollers and the inherent tractive properties of the materials used to form the sun roller and planetary rollers.

Further, in the automotive arts, it is desirable to be able to electromechanically adjust precisely, rapidly, and reliably, the throttle-shaft angle of a throttle of an internal combustion engine. In the prior art, such adjustment typically is provided by an expensive torque or stepper motor or by a conventional electric motor and geared transmission. Such a transmission can include a pinion gear, a compound idler gear, and a throttle shaft driven gear incorporated into a gearbox on the side of the throttle body. Typically this gearbox is undesirably large. Further, the geartrain requires tight tolerance relationships between gear centerlines, requiring precision control of both gear and gearbox dimensions. Further, this arrangement offers no opportunity to isolate the gears from impact loads due to contact with minimum and maximum mechanical stops for shaft rotation, which adversely affects gear durability.

What is needed is a simple, compact, inexpensive electromechanical means for rotating a throttle shaft through a working angle of about 90°.

It is a principal object of this invention to provide an improved planetary traction drive mechanism wherein adequate traction results from a combination of radial compression of planetary rollers and inherent tractive properties of the materials used to form the sun roller and planetary rollers.

It is a further object of this invention to provide an improved throttle assembly for an internal combustion engine including a simple, compact, inexpensive electromechanical means for rotating the throttle shaft through a working angle of about 90°.

SUMMARY OF THE INVENTION

Briefly described, the present invention is directed to an improved planetary traction drive mechanism and to an improved throttle valve including the improved actuator mechanism.

The housing of an electric drive motor supports at one end a cup-shaped member open at an outer end and defining the outer ring of a planetary drive mechanism. The input drive shaft of the motor extends axially into the cup-shaped member to define the sun friction roller of a planetary traction drive system and an annular space between the sun roller and the outer ring. A circular output plate is rotatably disposed on the motor drive shaft, and one or more pins, preferably three pins equilaterally disposed, extend from the surface of the plate into the annular space, parallel to the drive shaft, and rotatably support one or more planetary friction rollers disposed in radial compression between the outer ring and the sun roller. On the surface of the output plate opposite the pins an output shaft extends generally parallel to the rotational axes of the sun roller and planetary rollers. The output shaft may be coaxially aligned with the sun roller, or with any of the planetary rollers, or with none of them, and may be connected via a link to a lever arm on a device to be rotated, for example, the throttle shaft of a throttle valve on an internal combustion engine.

The planetary rollers are formed from a resilient composite polymer which is mildly compressible, has a suitably high coefficient of sliding friction against metal, a low coefficient of wear, and a high resistance to flexural fatigue. The rollers are formed having unstressed diameters greater than the radial distance between the sun roller and the friction ring, so that the rollers must be compressed slightly in order to be installed therein, thereby creating tractive friction with the sun roller and the friction ring.

The rollers may be formed as solid disks of resilient polymer or as deformable cylinders of resilient polymer loosely positioned on the pins.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DESCRIPTION OF THE PREFERRED EMBODIMENTS

Figure 1:
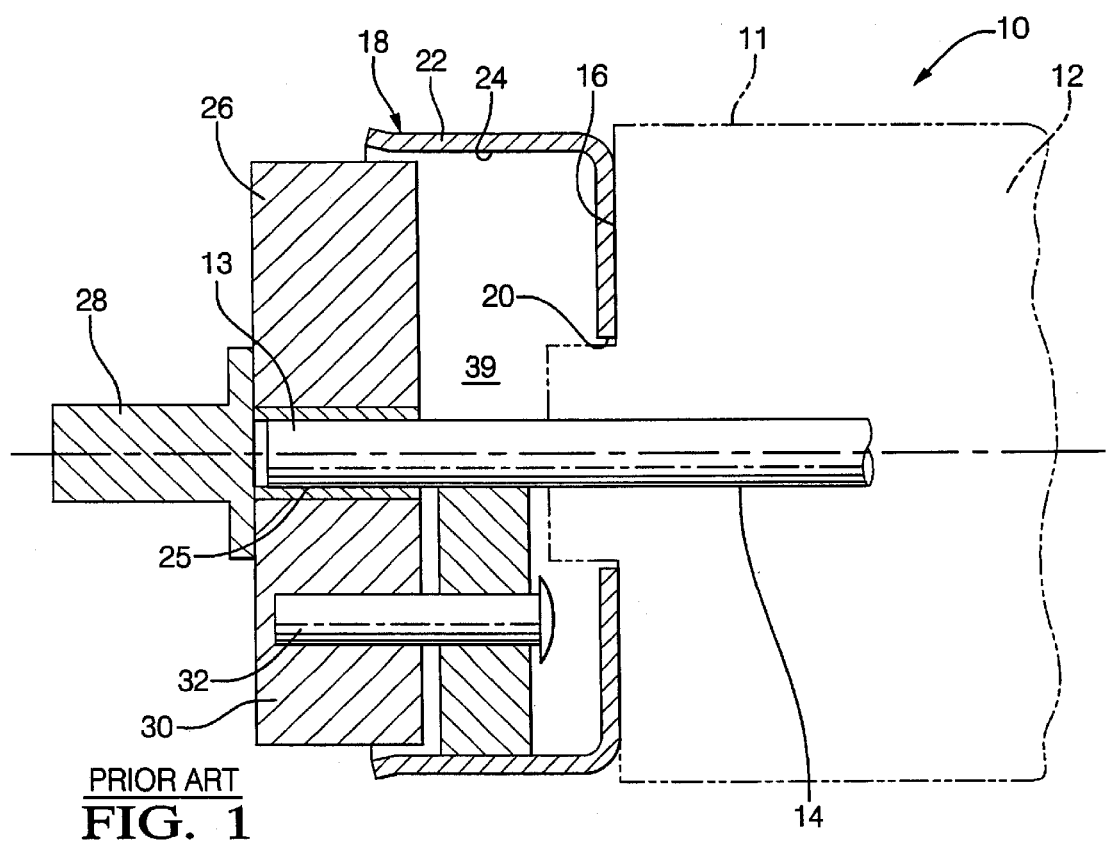
FIG. 1 is a cross-sectional view of a prior art planetary traction drive mechanism, corresponding to the second type described hereinabove.

Referring to FIG. 1, a prior art planetary traction drive mechanism 10 includes an electric motor 12 having a housing 11 and having an axial shaft 14 rotatable by the motor and extending from an end 16 of housing 11. Shaft 14 defines a drive or input shaft for the mechanism, a portion of the extended shaft thus defining a sun roller 13 for the planetary mechanism 10. Fixedly attached to end 16 is a cup-shaped member 18 having a central aperture 20 for passage of shaft 14 therethrough. Member 18 has an annular portion 22 having a cylindrical inner surface 24 defining an outer ring of a planetary drive system. Rotatably mounted on the outer end of shaft 14 is a circular output plate 26 having a driven or output shaft 28 rotatable with plate 26. Plate 26 may be journalled on a bushing or bearing 25 on shaft 14. A planetary roller 30 is disposed under radial compression in the annular space 39 between shaft 14 and surface 24 and is rotatably mounted on pin 32 extending from plate 26. Roller 30 is radially compressed because the unstressed diameter (not shown) of roller 30 is slightly greater than the distance 29 between sun roller 13 and inner surface 24. In principle, only one such roller is necessary, but in practice a plurality of rollers 30 are so disposed, typically three arranged equilaterally about shaft 14. In operation, rotation of shaft 14 causes roller(s) 30 to rotate in the opposite direction. Because member 18 is fixed to motor 12, roller(s) 30 precess about the shaft in the same rotational direction as that of the shaft but at a reduced rotational rate in known fashion, depending upon the respective diameters of the shaft and the roller(s).

Figure 1A:
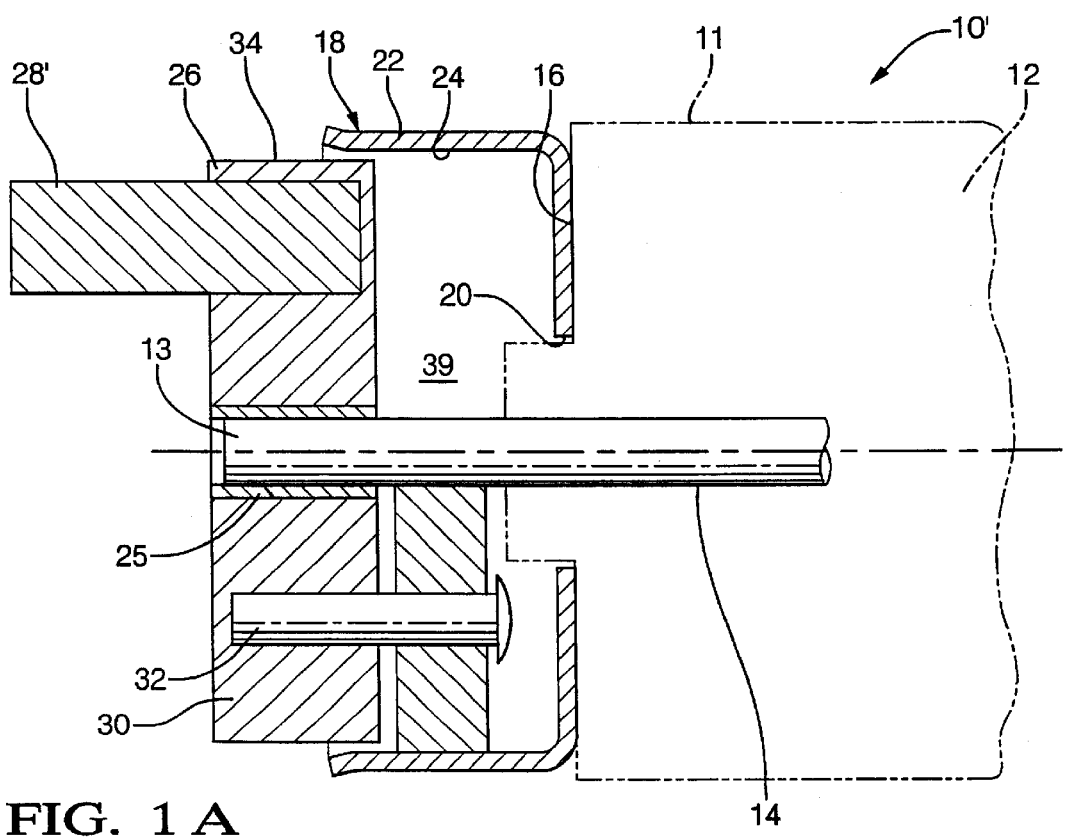
FIG. 1a is a cross-sectional view of a planetary traction drive mechanism in accordance with the invention wherein the output shaft is mounted non-coaxially on the output plate.

Referring to FIG. 1a, a first improved planetary traction drive mechanism 10' in accordance with the invention is substantially identical with prior art mechanism 10 except that improved output shaft 28' is disposed non-coaxially on output plate 26, and preferably near the periphery 34 of plate 26. Thus, shaft 28' is not rotated about its own axis by rotation of plate 26, as in the prior art, but rather is translated through an arc by such plate rotation. The improved mechanism is suited to tasks requiring translation rather than rotation of an element, an example of which is discussed hereinbelow.

Figure 2:
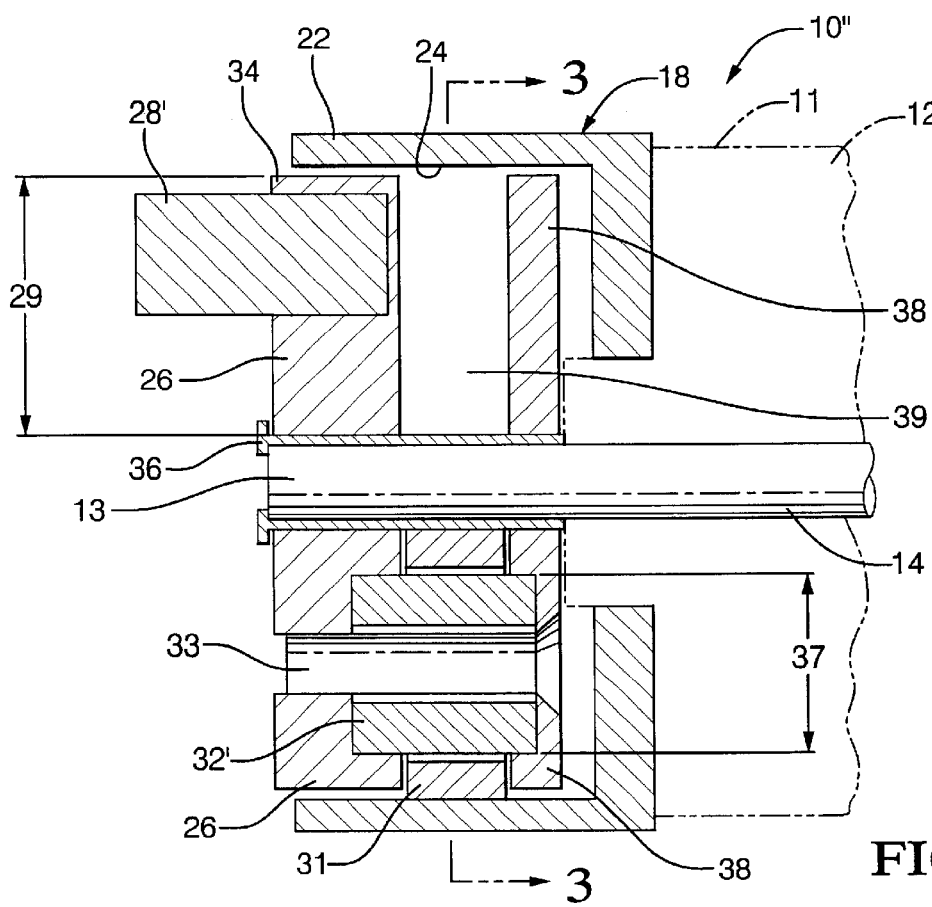
FIGS. 2 and 3 are orthogonal cross-sectional views of a planetary traction drive mechanism similar to that shown in FIG. 1a, wherein the planetary "rollers" comprise cylindrical sections loosely disposed on pins.
Figure 3:
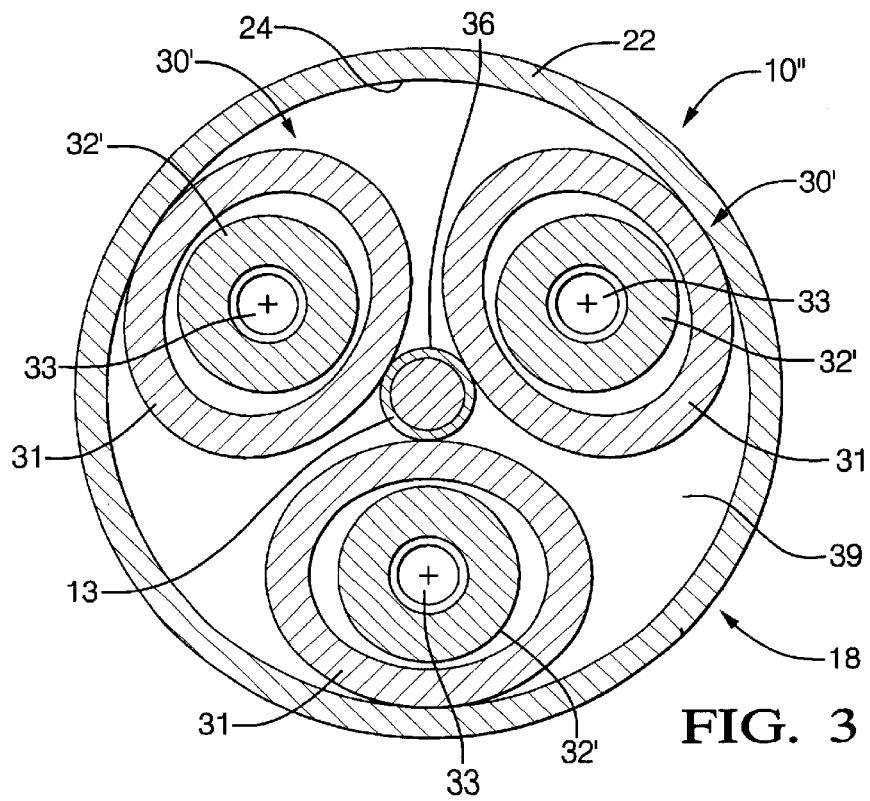
Figure 4:
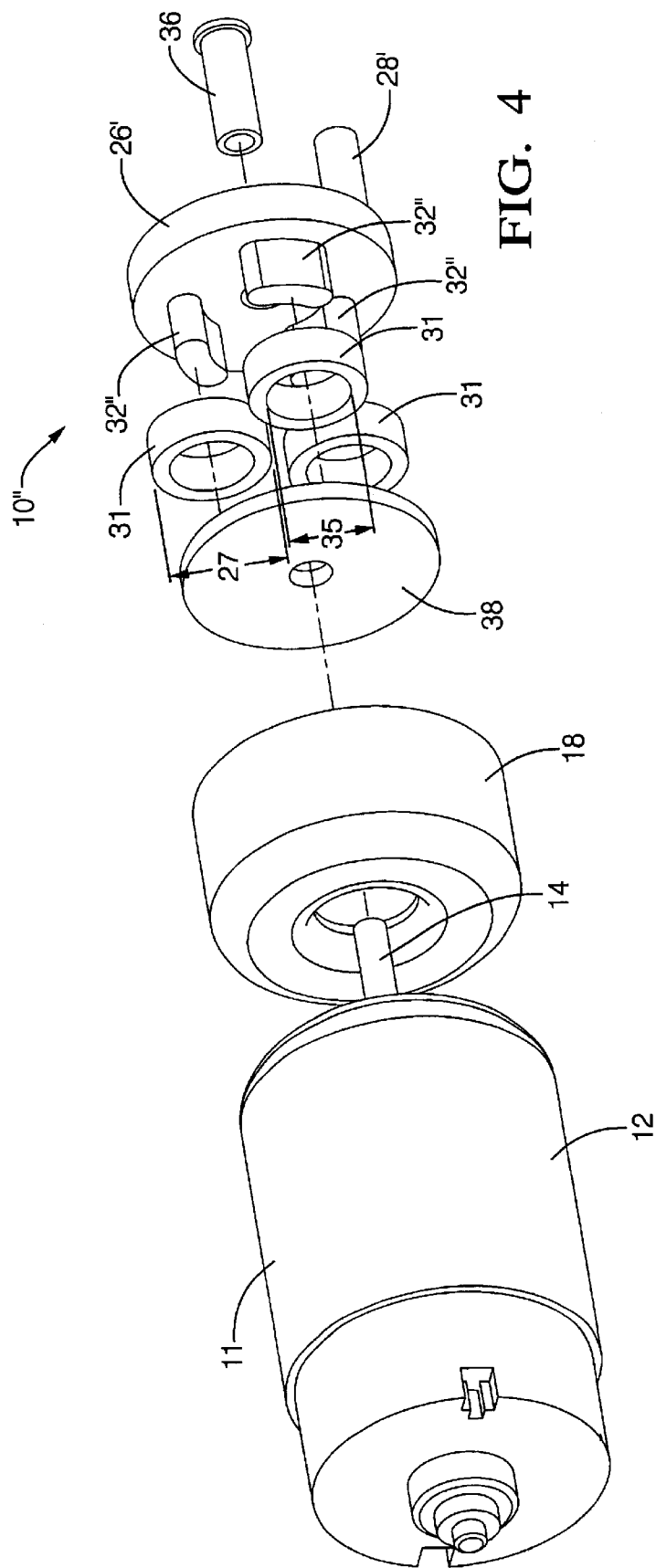
FIG. 4 is an exploded isometric view of the planetary device shown in FIGS. 2 and 3.
Figure 5:
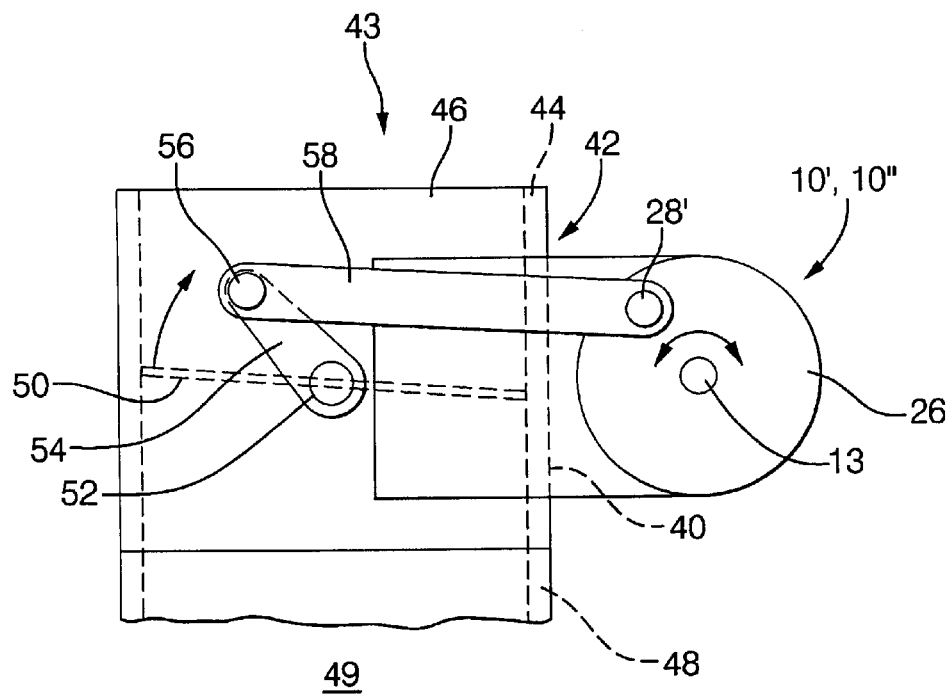
FIG. 5 is an elevational schematic view of a throttle valve actuated by a planetary mechanism in accordance with the invention.
Figure 6:
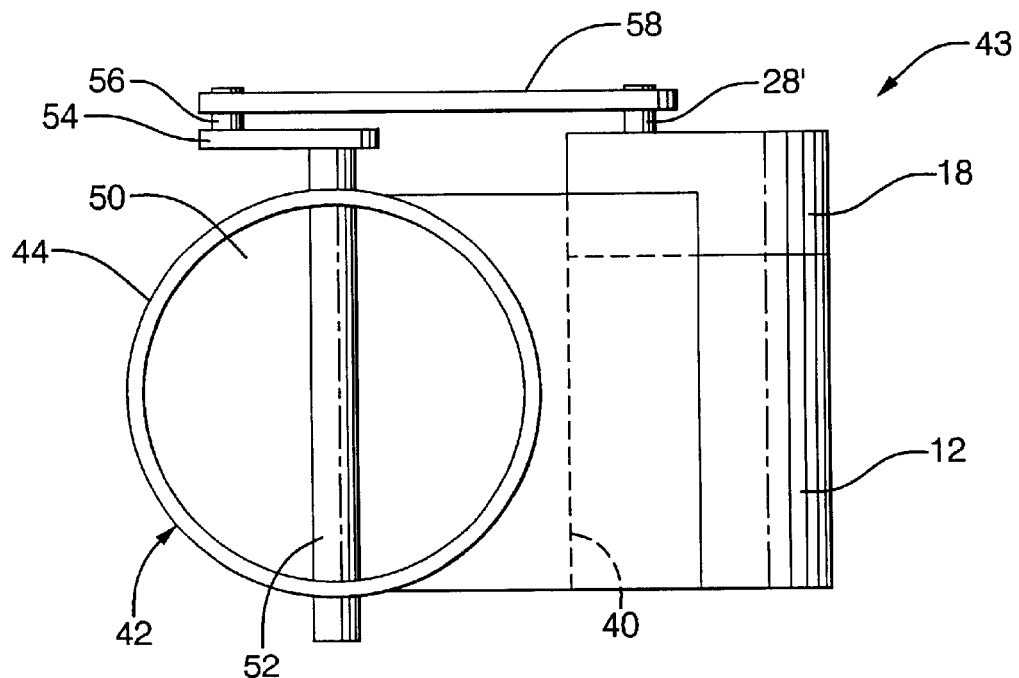
FIG. 6 is a plan schematic view of the throttle valve shown in FIG. 5.
Figure 7:
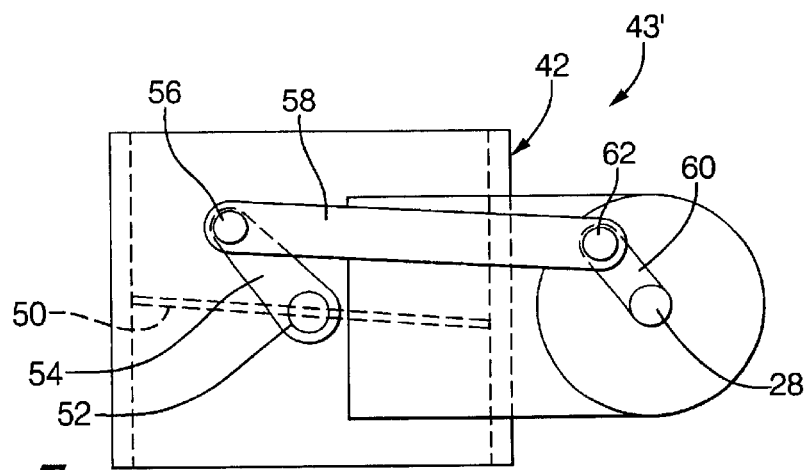
FIG. 7 is an elevational schematic view of a throttle valve actuated by a prior art planetary mechanism, the valve being shown in the closed position.
Figure 8:
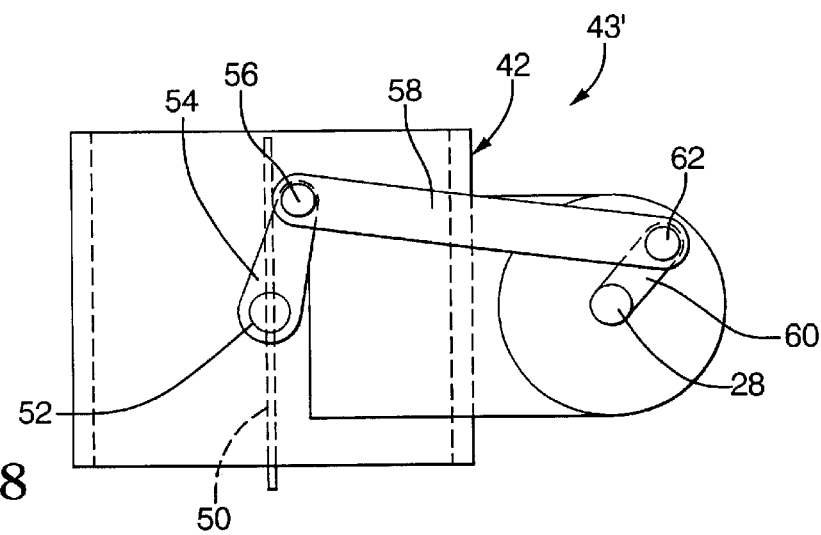
FIG. 8 is an elevational schematic view like that shown in FIG. 7, showing the planetary mechanism having actuated the valve to the open position.
Figure 9:
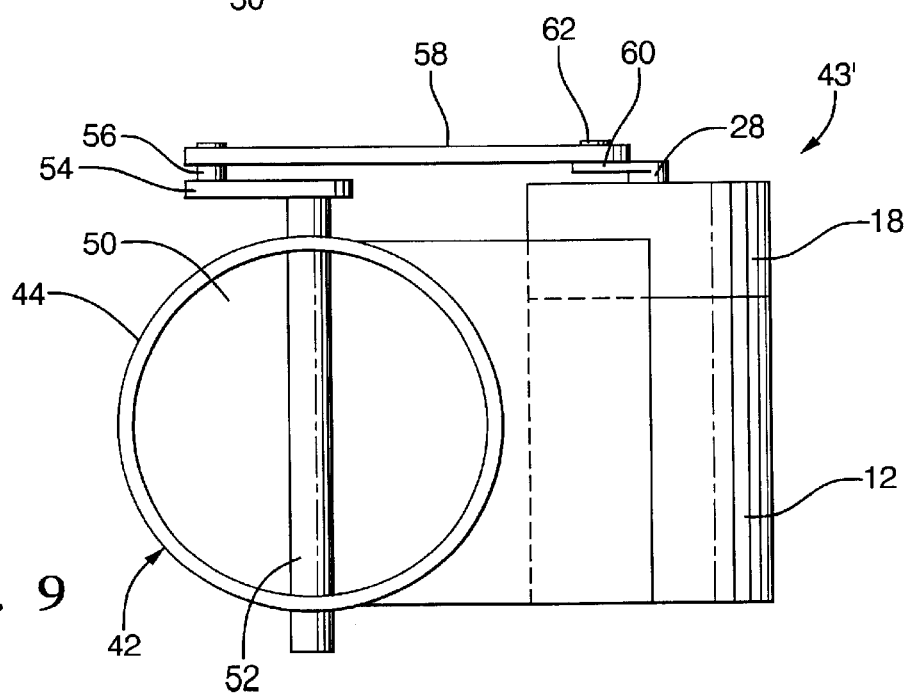
FIG. 9 is a plan schematic view of the throttle valve shown in FIG. 7.

Referring to FIGS. 2 through 4, a second improved planetary traction drive mechanism 10" in accordance with the invention is similar in several respects to first improved mechanism 10'. An electric motor 12 provides rotation for an axial shaft 14 including a sun roller 13 extending through a cup-shaped member 18. Member 18 has an annular portion 22 having a cylindrical inner surface 24 defining an outer ring of a planetary drive system. Rotatably mounted on the outer end of shaft 14 is a circular output plate 26 having a driven or output shaft 28'. Shaft 28' may be axially disposed, similar to the disposition of shaft 28 in prior art mechanism 10, for use as shown in FIGS. 7–9 and described hereinbelow. In a currently preferred embodiment, shaft 28' is disposed non-coaxially on output plate 26, and preferably near the periphery 34 of plate 26, for use as shown in FIGS. 5 and 6 and described hereinbelow.

An improved planetary roller assembly 30', and preferably three such roller assemblies equilaterally disposed about sun roller 13 as shown in FIG. 3, is disposed under radial compression in the annular space 39 between sun roller 13 and surface 24. Preferably, roller assembly 30' includes a generally tubular or cylindrical element 31 formed of a resilient polymer having a relatively high coefficient of friction, preferably greater than about 0.46, a relatively low coefficient of wear against steel, and high resistance to flexural fatigue. Cylindrical roller elements 31 may be formed conveniently, for example, by slicing cylindrical sections from a tube having an unstressed outer diameter 27 greater than the annular distance 29 between sun roller 13 and inner surface 24. The tube is formed preferably of a materials composite comprising polyetherimide loaded with 10 weight percent chopped fiberglass. Preferably, sun roller 13 is provided with a steel wear sleeve 36, and preferably cup-shaped member 18 is also formed of steel.

Roller element 31 is rotatably and loosely mounted on improved pin 32' extending from plate 26; that is, the inner diameter 35 of element 31 is substantially larger than the outer diameter 37 of pin 32'. Pin 32' does not serve as a roller bushing for element 31, in the sense as does pin 32 for roller 30 in FIGS. 1 and 1a; rather, improved pin 32' serves as a fulcrum for transmitting the torque load from the sun gear to the outer ring, and thereby forcing pin 32' and plate 26 to rotate about the sun gear.

Output plate 26 preferably is formed of a materials composite comprising a durable polymer, such as a polyamide (for example, nylon), loaded with a friction-reducing material such as polytetrafluoroethylene.

Referring to FIGS. 2–4, in a currently preferred embodiment, pins 32' are provided with an axial bore and are attached by bolts 33 extending through both output plate 26 and a backing plate 38 rotatably disposed on sleeve 36. This arrangement thus supports the pins on both sides of the elements 31 and prevents cocking of the pins from rotational force exerted by roller elements 31.

Alternatively, the posts may be formed as arcuate elements 32' and if desired may be cast integrally with an alternative output plate 26', as shown in FIG. 4. Such arcuate elements have an implicit diameter smaller than the inner diameter of elements 31.

Because the unstressed outer diameter 27 of element 31 is greater than the distance 29 between the sun roller 13 and inner surface 24, compressional resilience of elements 31 is an important parameter. As the inherently cylindrical elements 31 are radially/diametrically compressed when inserted around pins 32' into member 18, elements 31 are elastically deformed into a substantially elliptical shape, as shown in FIG. 3. This deformation provides the tractive force against surface 24 and sleeve 36 necessary to meet the torque load imposed on drive 10" in use.

Referring to FIGS. 5 and 6, an improved planetary traction drive mechanism 10' or 10" is mounted on the side 40 of a conventional throttle valve 42 to form an improved throttle valve assembly 43. Valve 42 comprises a body 44 having a bore 46 therethrough for the passage of gas, for example, air entering the intake manifold 48 of an internal combustion engine 49, and a butterfly 50 mounted on a rotatable cross-shaft 52 extending through body 44 for variably occluding bore 46 to regulate the volume of gas flowing through the valve. Shaft 52 is provided at a free end thereof with a rigid lever arm 54 and pin 56 for rotatably engaging a link 58 connected between pin 56 and output shaft 28'. Referring to FIG. 5, clockwise rotation of plate 26 and shaft 28' serves to rotate butterfly 50 clockwise, thereby opening valve 42.

The simplicity, compactness, and low cost of the mechanical linkage shown in FIGS. 5 and 6 is a particular advantage of throttle valve assemblies in accordance with the invention. By comparison, prior art assemblies (not shown) typically involve an expensive precision gear train comprising an actuating connection between an electric motor 12 and a throttle shaft 52.

Further, other known throttle valve assemblies (not shown) are actuable by torque motors or stepper motors in the position of motor 12 in FIGS. 5 and 6. Such torque motors are known to have relatively low torque output and/or relatively small total angles of actuation. In contrast, the planetary traction drive mechanism, because of the speed-reduction capability inherent in the mechanism, permits use of a relatively inexpensive ordinary electric motor which may be driven through a substantial number of revolutions of the sun roller to effect the full range of opening and closing of valve 42.

Referring FIGS. 7–9, a second embodiment 43' of an improved throttle valve assembly in accordance with the invention includes a planetary traction drive mechanism having a coaxially-positioned output shaft, as shown in prior art actuator 10 or as described hereinabove for a mechanism in accordance with the invention. Because the mode of motion of the output shaft 28 of the assembly is solely rotational, an additional lever arm 60 and pin 62 is attached to shaft 28 to provide translational motion for engaging link 58 similarly to the linkage in embodiment 43. Actuation of the assembly between fully closed and fully open is shown in FIGS. 7 and 8, respectively.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention include all embodiments falling within the scope and spirit of the appended claims.

What is claimed is:

1. A planetary traction drive mechanism comprising;
   a) an electric motor having a housing and a motor drive shaft extending from an end of said housing and defining a sun roller;
   b) an outer wall attached to said housing and surrounding said sun roller and defining an annular space between said outer wall and said sun roller;
   c) an output plate rotatably disposed on said drive shaft;
   d) an output shaft extending from said output plate; and
   e) at least one planetary roller mechanism disposed on said output plate,
   said roller mechanism including a pin extending from said output plate into said annular space, said pin being attached to said plate at a proximal end of said pin, and a tubular roller element loosely disposed on said pin, said tubular roller element having an inner diameter greater than the diameter of said pin and having an outer diameter greater than the distance between said sun roller and said outer wall, said tubular roller element being radially compressed between said outer wall and said sun roller.

2. A planetary traction drive mechanism in accordance with claim 1 further comprising a plurality of said planetary roller mechanisms disposed on said output plate between said sun roller and said outer wall.

3. A planetary traction drive mechanism in accordance with claim 2 comprising three planetary roller mechanisms disposed equilaterally about said sun roller.

4. A planetary traction drive mechanism in accordance with claim 1 wherein said tubular roller element is formed of an elastomer.

5. A planetary traction drive mechanism in accordance with claim 4 wherein said elastomer has a coefficient of friction greater than about 0.46.

6. A planetary traction drive mechanism in accordance with claim 4 wherein said elastomer is a material composite comprising polyetherimide.

7. A planetary traction drive mechanism in accordance with claim 1 wherein said output plate is formed of a material composite comprising a durable polymer.

8. A planetary traction drive mechanism in accordance with claim 7 wherein said durable polymer is a polyamide loaded with a friction-reducing material.

9. A planetary traction drive mechanism in accordance with claim 1 further comprising a backer plate rotatably disposed on said drive shaft within said outer wall and receivable of said pin at a distal end thereof for cooperating with said output plate in providing beam support for both ends of said pin.

10. A planetary traction drive mechanism in accordance with claim 1 further comprising a sleeve on said sun roller.

11. A planetary traction drive mechanism in accordance with claim 1 wherein said output shaft is disposed coaxially of said output plate.

12. An planetary traction drive mechanism in accordance with claim 1 wherein said output shaft is disposed non-coaxially of said output plate.

13. A planetary traction drive mechanism comprising;
a) an electric motor having a housing and a motor drive shaft extending from an end of said housing, said shaft extension defining a sun roller;
b) an outer wall attached to said housing and surrounding said sun roller and defining an annular space between said outer wall and said sun roller;
c) an output plate rotatably disposed on said drive shaft;
d) an output shaft extending from said output plate and being disposed non-coaxially of said output plate; and
e) at least one planetary roller mechanism disposed on said output plate in radial compression between said outer wall and said sun roller, wherein said at least one planetary roller mechanism is in contact with said outer wall and said sun roller.

* * * * *